(12) United States Patent
Tsurui et al.

(10) Patent No.: US 12,257,537 B2
(45) Date of Patent: Mar. 25, 2025

(54) SEPARATING DEVICE AND SEPARATING SYSTEM

(71) Applicant: Panasonic Intellectual Property Management Co., Ltd., Osaka (JP)

(72) Inventors: Shota Tsurui, Osaka (JP); Yoshiki Hayasaki, Osaka (JP); Masanao Kamakura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 381 days.

(21) Appl. No.: 17/769,976

(22) PCT Filed: Sep. 11, 2020

(86) PCT No.: PCT/JP2020/034557
§ 371 (c)(1),
(2) Date: Apr. 18, 2022

(87) PCT Pub. No.: WO2021/079648
PCT Pub. Date: Apr. 29, 2021

(65) Prior Publication Data
US 2022/0379251 A1 Dec. 1, 2022

(30) Foreign Application Priority Data

Oct. 21, 2019 (JP) ................................. 2019-192108

(51) Int. Cl.
*B01D 45/14* (2006.01)
*B04B 5/12* (2006.01)

(52) U.S. Cl.
CPC ................ *B01D 45/14* (2013.01); *B04B 5/12* (2013.01)

(58) Field of Classification Search
CPC ...... B01D 45/14; B04B 5/12; B04B 2005/125
See application file for complete search history.

(56) References Cited

U.S. PATENT DOCUMENTS 4,361,490 A * 11/1982 Saget ........................ B04B 5/12
210/512.3
4,460,393 A * 7/1984 Saget ........................ B04B 5/12
209/714

(Continued)

FOREIGN PATENT DOCUMENTS

FR       2648361 A1    12/1990
JP       S60-084172 A     5/1985

(Continued)

OTHER PUBLICATIONS

International Search Report dated Nov. 10, 2020 issued in International Patent Application No. PCT/JP2020/034557, with English translation.

(Continued)

*Primary Examiner* — Dung H Bui
(74) *Attorney, Agent, or Firm* — Rimon P.C.

(57) ABSTRACT

A separating device includes a casing, a rotor, and a blade. The casing has a gas inlet, a gas outlet, and a discharge port for solid substances. The rotor is disposed on an inner side of the casing and is configured to be rotatable around a central axis of rotation of the rotor, the central axis of rotation extending along an axial direction of the casing. The blade is disposed between the casing and the rotor and is configured to rotate together with the rotor. The blade has a first end adjacent to the gas inlet and a second end adjacent to the gas outlet. The casing has a space between the second end of the blade and the discharge port in the axial direction.

8 Claims, 13 Drawing Sheets

(56) References Cited

U.S. PATENT DOCUMENTS

| | | | | |
|---|---|---|---|---|
| 4,729,760 A * | 3/1988 | Saget | ............... | B04B 5/12 209/714 |
| 5,755,096 A * | 5/1998 | Holleyman | ............... | B01D 45/14 60/407 |
| 2002/0139249 A1* | 10/2002 | Livingston | ............... | B01D 45/14 55/406 |
| 2004/0237792 A1* | 12/2004 | Hallgren | ............... | B04B 7/08 96/281 |
| 2007/0017372 A1* | 1/2007 | Fukano | ............... | B04B 5/12 96/220 |
| 2008/0047239 A1* | 2/2008 | Zheng | ............... | B04C 5/13 55/428 |
| 2009/0211439 A1* | 8/2009 | Ulm | ............... | B01D 45/14 95/35 |
| 2010/0180854 A1* | 7/2010 | Baumann | ............... | B04B 5/005 123/196 R |
| 2012/0067788 A1* | 3/2012 | Boele | ............... | B04B 5/12 209/132 |
| 2014/0237963 A1* | 8/2014 | Inge | ............... | B04B 5/12 55/443 |
| 2015/0128544 A1* | 5/2015 | Roston | ............... | B01D 45/14 55/471 |
| 2018/0119617 A1* | 5/2018 | Pulter | ............... | B01D 19/0057 |
| 2019/0162089 A1* | 5/2019 | Ekeroth | ............... | B04B 9/02 |

FOREIGN PATENT DOCUMENTS

| | | |
|---|---|---|
| JP | S61-033650 U | 2/1986 |
| JP | H07-031118 U | 6/1995 |
| JP | 2017-192925 A | 10/2017 |
| JP | 2018-140383 A | 9/2018 |
| WO | 2016/163075 A1 | 10/2016 |

OTHER PUBLICATIONS

Extended European Search Report dated Oct. 28, 2022 issued in the corresponding European Patent Application No. 20879017.0.

* cited by examiner

SEPARATING DEVICE AND SEPARATING SYSTEM

CROSS-REFERENCE OF RELATED APPLICATIONS

This application is the U.S. National Phase under 35 U.S.C. § 371 of International Patent Application No. PCT/JP2020/034557, filed on Sep. 11, 2020, which in turn claims the benefit of Japanese Patent Application No. 2019-192108, filed on Oct. 21, 2019, the entire disclosures of which Applications are incorporated by reference herein.

TECHNICAL FIELD

The present invention relates to separating devices and separating systems, and specifically, to a separating device for separating solid substances contained in a gas from the gas and a separating system including the separating device.

BACKGROUND ART

Patent Literature 1 discloses a separating device including an outer cylinder, a rotor, and blades.

The outer cylinder has a first end having a gas inlet and a second end having a gas outlet. The rotor is disposed on an inner side of the outer cylinder such that a central axis of rotation of the rotor coincides with a central axis of the outer cylinder. The plurality of blades are disposed between the rotor and the outer cylinder to be apart from each other in an outer circumferential direction of the rotor. The plurality of blades are connected to the rotor. The outer cylinder has a discharge hole between the first end and the second end. The discharge hole penetrates the outer cylinder such that the outside and the inside of the outer cylinder are in communicative connection with each other.

In the separating device disclosed in Patent Literature 1, separative performance of separating solid substances from a gas may be degraded depending on particle sizes of the solid substances to be separated.

CITATION LIST

Patent Literature

Patent Literature 1: JP 2018-140383 A

SUMMARY OF INVENTION

Technical Problem

It is an object of the present disclosure to provide a separating device and a separating system which are configured to improve separative performance of separating solid substances contained in a gas from the gas.

Solution to Problem

A separating device according to an aspect of the present disclosure includes a casing, a rotor, and a blade. The casing has a gas inlet, a gas outlet, and a discharge port for solid substances. The rotor is disposed on an inner side of the casing and is configured to be rotatable around a central axis of rotation of the rotor, the central axis of rotation extending along an axial direction of the casing. The blade is disposed between the casing and the rotor and is configured to rotate together with the rotor. The blade has a first end adjacent to the gas inlet and a second end adjacent to the gas outlet. The casing has a space between the second end of the blade and the discharge port in the axial direction.

A separating system according to an aspect of the present disclosure includes the separating device and a driving device. The driving device is configured to rotationally drive the rotor.

DESCRIPTION OF EMBODIMENTS

FIGS. 1 to 3, 5, 6, 8A to 13 described in the following embodiment and the like are schematic views, and the ratio of sizes and the ratio of thicknesses of components in the figures do not necessarily reflect actual dimensional ratios.

Embodiment

A separating device 1 according to an embodiment and a separating system 10 including the separating device 1 will be described below with reference to FIGS. 1 to 4.

(1) Overview

The separating device 1 is provided upstream of, for example, an air conditioning facility having an air blowing function and is configured to separate solid substances in air (gas). The separating device 1 is installed on a rooftop of a facility (e.g., a dwelling house) having a flat roof or on ground. The air conditioning facility is, for example, an air blowing device configured to blow air from upstream to downstream. The air blowing device is, for example, an electric fan. The air conditioning facility is not limited to the air blowing device but may be, for example, a ventilating device, an air conditioner, an air supply cabinet fan, or an air conditioning system including an air blowing device and a heat exchanger. The flow rate of air caused by the air conditioning facility to flow to the separating device 1 is, for example, 50 $m^3/h$ to 500 $m^3/h$. The outflow volume of air from the separating device 1 toward the air conditioning facility is substantially equal to the flow rate of air flowing through the air conditioning facility.

Figure 1:
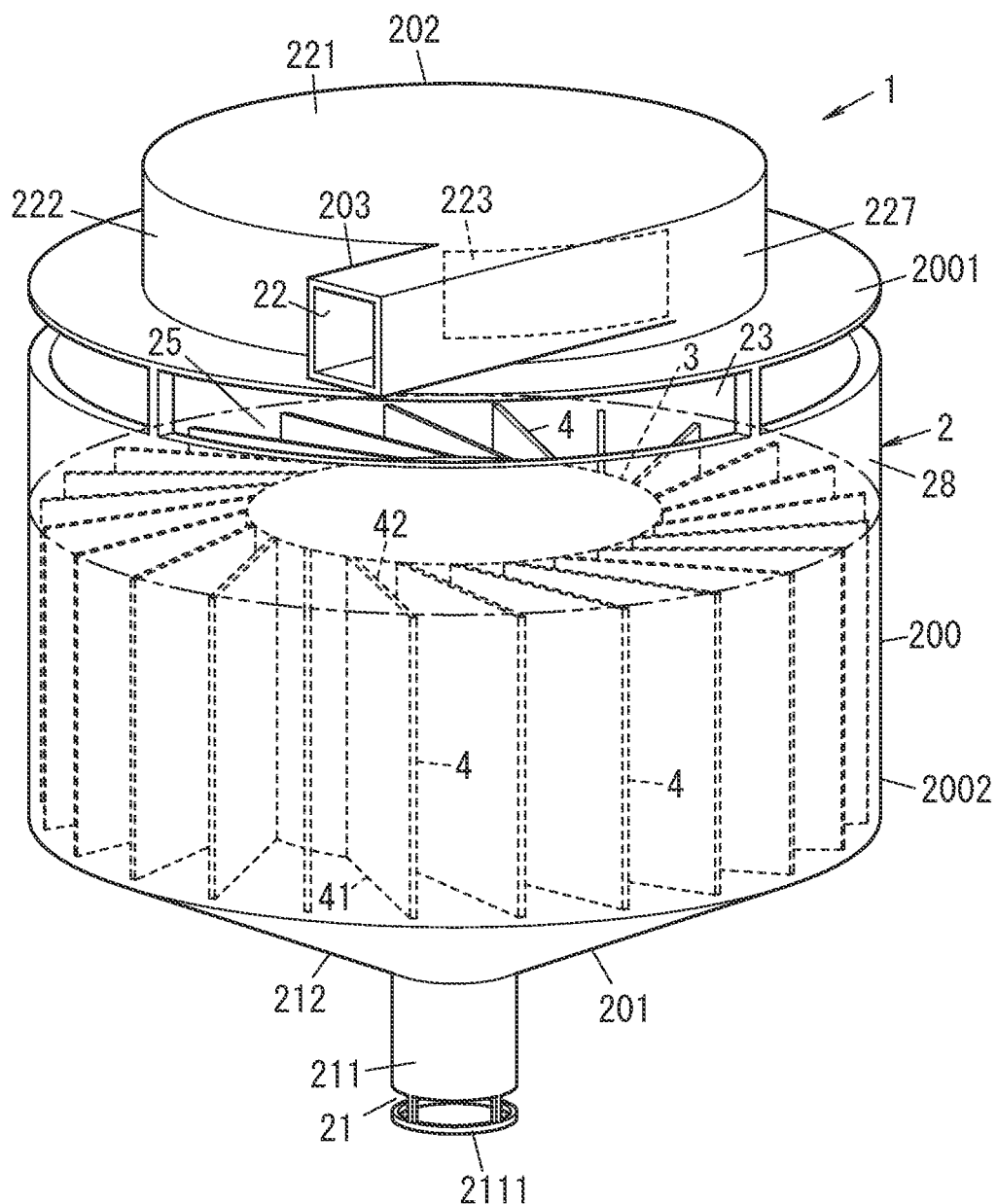
FIG. 1 is a perspective view of a separating device according to an embodiment.
Figure 2:
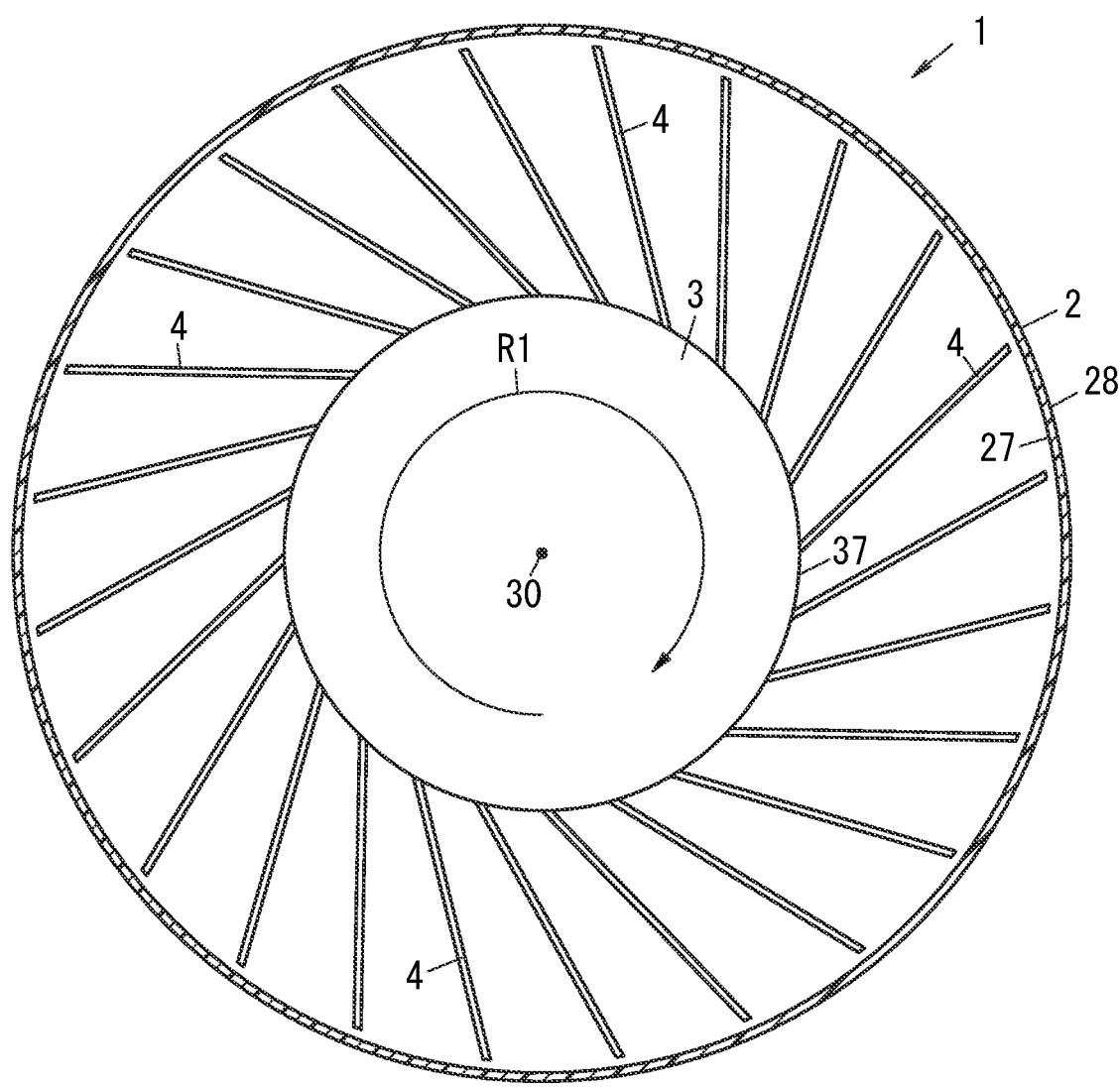
FIG. 2 is a cross-sectional view of the separating device.
Figure 3:
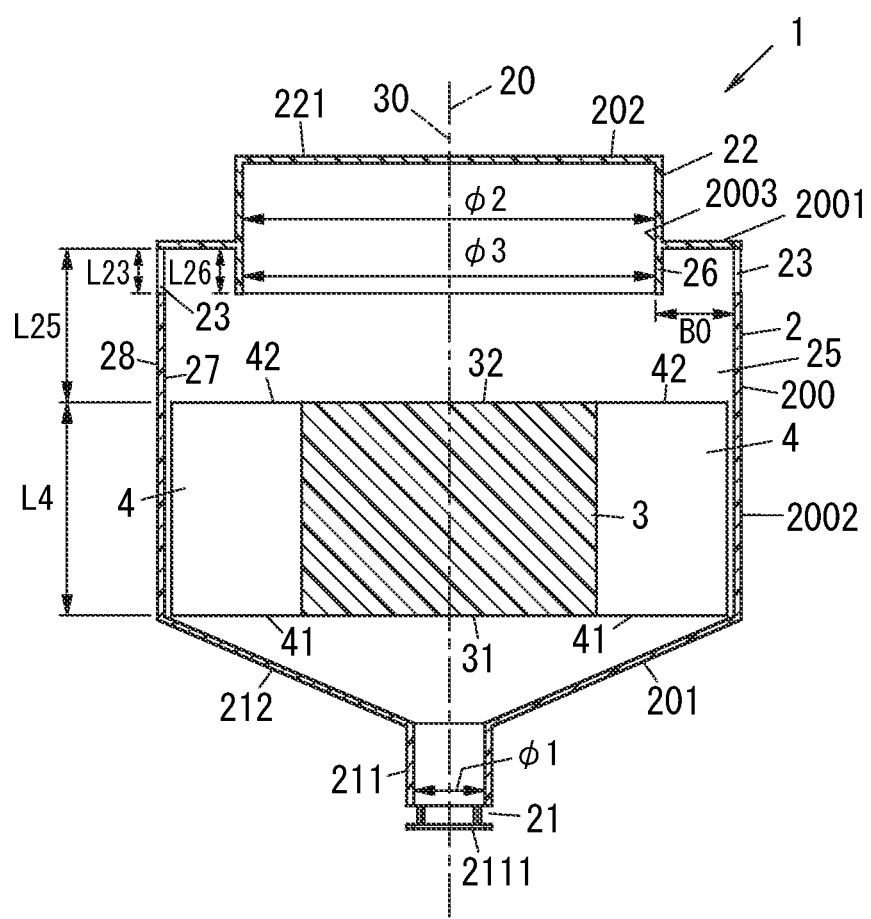
FIG. 3 is a longitudinal sectional view of the separating device.
Figure 4:
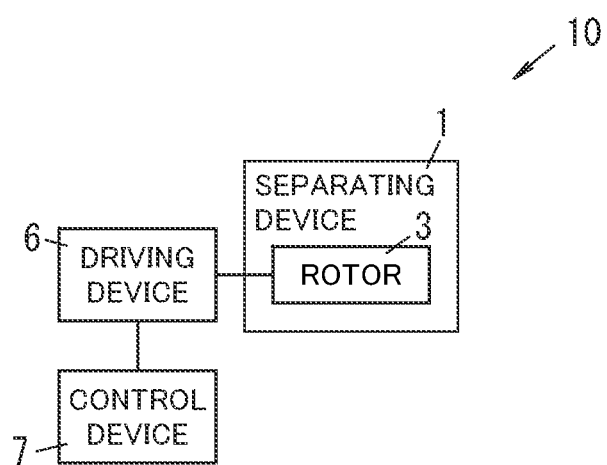
FIG. 4 is a schematic configuration diagram of a separating system including the separating device.

As shown in FIGS. 1 to 3, the separating device 1 includes a casing 2, a rotor 3, and blades 4. Moreover, the separating system 10 includes the separating device 1 and a driving device 6 as shown in FIG. 4.

The casing 2 has a gas inlet 21, a gas outlet 22, a discharge port 23 for solid substances. The rotor 3 is disposed on an inner side of the casing 2. The rotor 3 is rotatable around a central axis of rotation 30 (see FIGS. 2 and 3), and the central axis of rotation 30 extends along an axial direction of the casing 2. The blades 4 are disposed between the casing 2 and the rotor 3. The blades 4 rotate together with the rotor 3. Each blade 4 has a first end 41 adjacent to the gas inlet 21 and a second end 42 adjacent to the gas outlet 22. The casing 2 has a space 25 between the discharge port 23 and the second ends 42 of the blades 4 and in the axial direction of the casing 2.

The discharge port 23 is a hole for discharging solid substances contained in, for example, air to an outer side of the casing 2. The discharge port 23 connects an inside space of the casing 2 and an outside space of the casing 2 to each other. In other words, the inside and the outside of the casing 2 are in communicative connection with each other via the discharge port 23. The separating device 1 generates, in the casing 2, an airflow swirling in the casing 2 when the rotor 3 rotates. In the separating device 1, part of a flow path from the gas inlet 21 toward the gas outlet 22 is formed between the casing 2 and the rotor 3.

The separating device 1 is configured to cause air flowing from upstream into the casing 2 to flow downstream while the separating device 1 helically rotates the air around the rotor 3. In the present embodiment, "upstream" means a side (primary side) in a direction opposite from a direction in which air flows, and "downstream" means a side (secondary side) in the direction in which the air flows. The separating device 1 is used, for example, with the gas outlet 22 being located above the gas inlet 21. In this case, the separating device 1 is configured such that air flowing through the gas inlet 21 formed in the casing 2 into the flow path is caused to helically rotate around the rotor 3 to flow upward to the gas outlet 22.

The casing 2 of the separating device 1 has the discharge port 23 in order to discharge the solid substances contained in the air to the outer side of the casing 2. Thus, at least some of the solid substances contained in the air flowing in the casing 2 through the gas inlet 21 of the casing 2 are discharged to the outer side of the casing 2 through the discharge port 23 in the course of passing through the flow path.

Moreover, the separating system 10 includes the driving device 6 in addition to the separating device 1 as described above. The driving device 6 rotationally drive the rotor 3. That is, the driving device 6 rotates the rotor 3 around the central axis of rotation 30. The driving device 6 includes, for example, a motor.

Examples of the solid substances in the air include fine particles and dust. Examples of the fine particles include particulate matter. Examples of the particulate matter include primary particles emitted directly to air as fine particles and secondary particles emitted to the air as a gas and formed into fine particles in the air. Examples of the primary produced particles include soil particles (e.g., yellow dust), powder dust, vegetal-origin particles (e.g., pollen), animal-origin particles (e.g., spores of mold), and soot. Examples of the particulate matter include PM1.0 and PM2.5 (fine particulate matters), PM10, and SPM (suspended particulate matter) classified based on their sizes. PM1.0 refers to fine particles passing through a sizing device with a collection efficiency of 50% at a particle size of 1.0 μm. PM2.5 refers to fine particles passing through a sizing device with a collection efficiency of 50% at a particle size of 2.5 μm. PM10 refers to fine particles passing through a sizing device with a collection efficiency of 50% at a particle size of 10 μm. SPM refers to fine particles passing through a sizing device with a collection efficiency of 100% at a particle size of 10 μm, and SPM corresponds to PM6.5 to PM7.0 and refers to fine particles slightly smaller than PM10.

(2) Details

As described above, the separating device 1 includes the casing 2, the rotor 3, and the blades 4. Moreover, the separating system 10 includes the separating device 1 and the driving device 6.

A material for the casing 2 is, for example, but is not limited to, metal but may be a resin (e.g., ABS resin). Moreover, the casing 2 may include a metal part made of metal and a resin part made of a resin.

The casing 2 includes a casing body 200, a first end part 201, a second end part 202, and an outlet duct part 203. In this embodiment, the first end part 201, the casing body 200, and the second end part 202 are aligned in this order in the casing 2 in the axial direction of the casing 2. In the casing 2, the first end part 201 has the gas inlet 21, the outlet duct part 203 has the gas outlet 22, and the casing body 200 has the discharge port 23. The gas inlet 21, the gas outlet 22, and the discharge port 23 are open lateral to the casing 2. In the axial direction of the casing 2, the discharge port 23 is located between the gas inlet 21 and the gas outlet 22. In the axial direction of the casing 2, the distance between the discharge port 23 and the gas outlet 22 is shorter than the distance between the discharge port 23 and the gas inlet 21.

The casing body 200 is in the shape of a bottomed cylinder having a bottom part 2001 and a cylindrical part 2002 and surrounds the rotor 3. The bottom part 2001 has an opening 2003 having a circular shape and penetrating through the bottom part 2001 in the axial direction of the casing 2. The axial direction of the casing 2 is a direction along the central axis of the casing body 200 (an axial direction of the casing body 200). In the casing 2, the central axis of the casing body 200 serves as a central axis 20 (see FIG. 3) of the casing 2. In the axial direction of the casing 2, the length of the casing body 200 is longer than the length of the rotor 3. The inner diameter and the outer diameter of the casing body 200 are each fixed over the entire length in the axial direction of the casing body 200. The discharge port 23 is formed along an outer peripheral edge of the casing 2. In this embodiment, the discharge port 23 is formed in an outer peripheral surface 28 of the casing 2 (here, an outer peripheral surface of the casing body 200). The discharge port 23 is formed, in the cylindrical part 2002 of the casing body 200, in the vicinity of the bottom part 2001.

The casing body 200 includes a plurality of (in the example shown in the figure, four) discharge ports 23. When viewed in the axial direction of the casing 2, the plurality of discharge ports 23 each have, for example, a substantially quarter arc shape and are aligned in a circumferential direction along an outer peripheral edge of the casing body 200. The opening range of each of the four discharge ports 23 is slightly smaller than 90 degrees with the central axis of the casing body 200 as being the center. In the separating device 1, solid substances passing in the vicinity of an inner peripheral surface 27 of the casing 2 (here, an inner peripheral surface of the casing body 200) can be discharged through the discharge ports 23. The casing 2 may have one discharge port 23, and the one discharge port 23 may have an annular shape formed over the entire circumference in the circumferential direction of the casing body 200. In this case, the casing body 200 is divided into, for example, two members facing each other in the axial direction of the casing 2 with the discharge port 23 provided therebetween.

The first end part 201 is provided upstream of the casing body 200 in the axial direction of the casing 2. The first end part 201 is connected to the casing body 200. The first end part 201 has an inside space in communicative connection with an inside space of the casing body 200. The first end part 201 has: a small diameter part 211 having the gas inlet 21 and having a bottomed cylindrical shape; and an expanding diameter part 212. The outer diameter and the inner diameter of the small diameter part 211 are respectively smaller than the outer diameter and the inner diameter of the casing body 200. The gas inlet 21 is formed in the small diameter part 211, in the vicinity of a bottom part 2111 of the small diameter part 211. The expanding diameter part 212 has a taper cylindrical shape with the outer diameter and the inner diameter of the expanding diameter part 212 gradually increasing toward the casing body 200 as the distance from the small diameter part 211 increases in the axial direction of the casing 2. The expanding diameter part 212 has a first end adjacent to the small diameter part 211 and a second end adjacent to the casing body 200. The first end of the expanding diameter part 212 is connected to the small diameter part 211. The second end of the expanding diameter part 212 is connected to the casing body 200. The outer diameter and the inner diameter of the expanding diameter part 212 at the end adjacent to the small diameter part 211 in the axial direction of the casing 2 are respectively the same as the outer diameter and the inner diameter of the small diameter part 211. The outer diameter and the inner diameter of the expanding diameter part 212 at the end adjacent to the casing body 200 in the axial direction of the casing 2 are respectively the same as the outer diameter and the inner diameter of the casing body 200. That is, the opening area of the expanding diameter part 212 gradually increases as the distance from the gas inlet 21 increases in the axial direction of the casing 2.

The second end part 202 is provided downstream of the casing body 200 in the axial direction of the casing 2 and covers the opening 2003 of the bottom part 2001 of the casing body 200. The second end part 202 is connected to the casing body 200. The second end part 202 has an inside space in communicative connection with the inside space of the casing body 200. The second end part 202 has a bottomed cylindrical shape having a disk-shaped bottom part 221 and a peripheral wall 222 having a cylindrical shape. The peripheral wall 222 of the second end part 202 has an opening 223 through which the gas flows out. The opening 223 penetrates the peripheral wall 222 in a direction orthogonal to the axial direction of the casing 2. The inner diameter φ2 (see FIG. 3) and the outer diameter of the peripheral wall 222 are each fixed over the entire length in the axial direction of the casing body 200. The inner diameter φ2 of the peripheral wall 222 is the same as, for example, the diameter of the opening 2003 formed in the bottom part 2001 of the casing body 200.

The outlet duct part 203 is connected to the second end part 202. The outlet duct part 203 has an inside space in communicative connection with the inside space of the second end part 202.

The outlet duct part 203 is connected to, for example, the peripheral edge of the opening 223 at an outer peripheral surface 227 of the second end part 202. The outlet duct part 203 is a duct for feeding the gas from which solid substances have been separated to the outer side of the casing 2. When viewed in the axial direction of the casing 2, the outlet duct part 203 extends from the outer peripheral surface 227 of the second end part 202 in a direction along a tangential direction of the outer peripheral surface 227. In this embodiment, the tangential direction is a direction along a rotation direction R1 (see FIG. 2) of the rotor 3. The gas outlet 22 is formed in an opposite part of the outlet duct part 203 from the opening 223 of the second end part 202. The outlet duct part 203 has a rectangular tubular shape. The opening shape of the gas outlet 22 is, for example, square.

The rotor 3 is disposed coaxially with the casing 2 on the inner side of the casing 2. Saying "disposed coaxially with the casing 2" means that the rotor 3 is disposed such that the central axis of rotation 30 (see FIG. 3) of the rotor 3 coincides with the central axis 20 (see FIG. 3) of the casing 2. The rotor 3 has, for example, a columnar shape. Examples of a material for the rotor 3 is a polycarbonate resin.

In a direction along the central axis of rotation 30 of the rotor 3, the rotor 3 has a length shorter than the length of the casing body 200 in the axial direction of the casing 2.

The rotor 3 has a first end 31 adjacent to the gas inlet 21 and a second end 32 adjacent to the gas outlet 22. The rotor 3 is disposed in the vicinity of the first end part 201 in the axial direction of the casing 2. More specifically, the distance between the rotor 3 and the first end part 201 is shorter than the distance between the rotor 3 and the second end part 202 in the axial direction of the casing 2.

In the separating device 1, a plurality of (here, 24) blades 4 are disposed between the casing 2 and the rotor 3. That is, the separating device 1 includes the plurality of blades 4. The plurality of blades 4 are connected to the rotor 3 and are apart from the casing 2. The plurality of blades 4 rotate together with the rotor 3.

The plurality of blades 4 are provided to the rotor 3 over the entire length of the rotor 3 in a direction along the axial direction of the casing 2. That is, the plurality of blades 4 are provided from the first end 31 through the second end 32 of the rotor 3. Examples of a material for the plurality of blades 4 include a polycarbonate resin. In the separating device 1, the same material is adopted for the rotor 3 and the plurality of blades 4, but this should not be construed as limiting the disclosure. The material for the rotor 3 and the material for the plurality of blades 4 may be different from each other. The plurality of blades 4 may be formed integrally with the rotor 3, or each of the plurality of blades 4 may be formed as members separated from the rotor 3 and may be fixed to the rotor 3, thereby being connected to the rotor 3.

Each of the plurality of blades 4 is disposed such that a gap is formed between each blade 4 and the casing 2 when viewed in the axial direction of the casing 2. In other words, the separating device 1 has a gap between each of the plurality of blades 4 and the inner peripheral surface 27 of the casing 2. In the radial direction of the rotor 3, the distance between a protruding tip end of each of the plurality of blades 4 and an outer peripheral surface 37 of the rotor 3 is shorter than the distance between the outer peripheral surface 37 of the rotor 3 and the inner peripheral surface 27 of the casing 2.

Each of the plurality of blades 4 is disposed in a space (the flow path) between the outer peripheral surface 37 of the rotor 3 and the inner peripheral surface 27 of the casing 2 to be parallel to the central axis of rotation 30 of the rotor 3. Each of the plurality of blades 4 has a flat plate shape. Each of the plurality of blades 4 has a rectangular shape elongated in the direction along the central axis of rotation 30 of the rotor 3 viewed in a thickness direction defined with respect to each of the plurality of blades 4. Each of the plurality of blades 4 is tilted by a prescribed angle (e.g., 45 degrees) to one radial direction of the rotor 3 when viewed form the second end part 202 in the direction along the axial direction of the casing 2. In this embodiment, each of the plurality of blades 4 has a tip end adjacent to the casing 2 and a base end adjacent to the rotor 3 in a protrusion direction from the rotor 3, and the tip end is located rearward of the base end in the rotation direction R1 (see FIG. 2) of the rotor 3. That is, in the separating device 1, each of the plurality of blades 4 is tilted to the one radial direction of the rotor 3 by the prescribed angle (e.g., 45 degrees) in the rotation direction R1 of the rotor 3. The prescribed angle is not limited to 45 degrees but may be an angle greater than 0 degree and less than or equal to 90 degrees. For example, the prescribed angle may be an angle within a range from 10 degrees to 80 degrees. Each of the plurality of blades 4 is not necessarily tilted with respect to the radial direction of the rotor 3 by the prescribed angle in the rotation direction R1 of the rotor 3 but may have, for example, an angle of 0 degree with respect to the radial direction of the rotor 3. That is, the plurality of blades 4 may radially extend from the rotor 3. As illustrated in FIG. 2, the plurality of blades 4 are disposed to be apart from each other at equal angular intervals in a circumferential direction of the rotor 3. The "equal angular interval" as used herein is not limited to only the case of a strictly equal angular interval but may be, for example, an angular interval within a prescribed error range (e.g., ±10% of the prescribed angular interval) with respect to a prescribed angular interval.

In the axial direction of the casing 2, the length of each of the plurality of blades 4 is equal to the length of the rotor 3. In this embodiment, the length of each of the plurality of blades 4 is not limited to the case of being equal to the length of the rotor 3 but may be longer or shorter than the length of the rotor 3.

In the axial direction of the casing 2, the length of each of the plurality of blades 4 is shorter than the length of the casing body 200. In the direction along the central axis of rotation 30 of the rotor 3, the length of each of the plurality of blades 4 is shorter than the distance between the first end part 201 of the casing 2 and the discharge port 23.

Each of the plurality of blades 4 has the first end 41 which is an end adjacent to the gas inlet 21 (here, an end adjacent to the first end part 201) and the second end 42 which is an end adjacent to the gas outlet 22 (here, an end adjacent to the second end part 202) in the axial direction of the casing 2. The first end 41 of each of the plurality of blades 4 is an end (upstream end) adjacent to the first end part 201 in the axial direction of the casing 2. The second end 42 of each of the plurality of blades 4 is an end (downstream end) adjacent to the second end part 202 in the axial direction of the casing 2.

The casing 2 has the space 25 between the second end 42 of each blade 4 and the discharge port 23 in the axial direction of the casing 2. In the separating device 1, the discharge port 23 is at a location where the discharge port 23 overlaps the space 25 in a direction orthogonal to the central axis of rotation 30 of the rotor 3. That is, the discharge port 23 is at a location where the discharge port 23 overlaps the space 25 in the direction orthogonal to the axial direction of the casing 2. Moreover, in the separating device 1, the discharge port 23 is at a location where the discharge port 23 does not overlap each blade 4 in the direction orthogonal to the central axis of rotation 30 of the rotor 3. That is, the discharge port 23 is at a location where the discharge port 23 does not to overlap each blade 4 in the direction orthogonal to the axial direction of the casing 2. In other words, each blade 4 is not in a projection area of the discharge port 23 when the casing 2 is viewed from the side.

In the separating device 1, the ratio ($L25/(L4+L25)$) of the length $L25$ (see FIG. 3) of the space 25 to the sum ($L4+L25$) of the length $L4$ (see FIG. 3) of the blade 4 and the length $L25$ (see FIG. 3) of the space 25 in the axial direction of the casing 2 is, for example, 0.4.

In the separating device 1, the casing 2 further includes a partition wall 26 (see FIG. 3) in the space 25, and the partition wall 26 partitions between the discharge port 23 and the gas outlet 22. In the axial direction of the casing 2, the length $L26$ of the partition wall 26 is equal to the length $L23$ of the discharge port 23 but is not limited to this example and may be different from the length $L23$ of the discharge port 23. The partition wall 26 has, for example, an annular shape. The inner diameter $\phi3$ of the partition wall 26 is equal to the inner diameter $\phi2$ of the peripheral wall 222 of the second end part 202 but is not limited to this example and may be different from the inner diameter $\phi2$ of the peripheral wall 222 of the second end part 202.

As shown in FIG. 4, the separating system 10 includes the separating device 1 and the driving device 6 configured to rotationally drive the rotor 3 of the separating device 1. The driving device 6 includes, for example, a motor configured to rotationally drive the rotor 3. In the driving device 6, a rotation shaft of the motor may be directly or indirectly coupled to the rotor 3, or rotation of the rotation shaft of the motor may be transmitted to the rotor 3 via a pulley and a rotary belt. The motor may be disposed on the inner side of the casing 2 or may be disposed on the outer side of the casing 2. The rotational velocity of the rotor 3 rotationally driven by the driving device 6 is, for example, 1500 rpm to 3000 rpm.

The separating system 10 further includes a control device 7 configured to control the driving device 6. The control device 7 includes a computer system. The computer system includes a processor and memory as principal hardware components. The processor executes a program stored in the memory of the computer system, thereby implementing functions as the control device 7. The program may be stored in the memory of the computer system in advance, may be provided via the telecommunications network, or may be provided as a non-transitory recording medium such as a computer system-readable memory card, optical disc, or hard disk drive storing the program. The processor of the computer system may be made up of a single or a plurality of electronic circuits including a semiconductor integrated circuit (IC) or a largescale integrated circuit (LSI). The integrated circuit such as IC or LSI mentioned herein may be referred to in another way, depending on the degree of the integration and includes integrated circuits called system LSI, very-large-scale integration (VLSI), or ultra-large-scale integration (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. The plurality of electronic circuits may be collected on one chip or may be distributed on a plurality of chips. The plurality of chips may be collected in one device or may be distributed in a plurality of devices. As mentioned herein, the computer system includes a microcontroller including one or more processors and one or more memory components. Thus, the microcontroller is also composed of one or more electronic circuits including a semiconductor integrated circuit or a large-scale integrated circuit.

(3) Operation of Separating Device and Separating System

In the separating device 1 according to the embodiment, the rotation direction R1 (see FIG. 2) of the rotor 3 is, for example, a clockwise direction when the rotor 3 is viewed from the second end part 202 in the axial direction of the casing 2. The separating system 10 rotationally drives the rotor 3 by the driving device 6.

In the separating device 1, rotation of the rotor 3 provided with the blades 4 enables force to be applied to air flowing in the inside space (flow path) of the casing 2 in a rotation direction around the central axis of rotation 30. In the separating device 1, the rotation of the rotor 3 rotates the plurality of blades 4 together with the rotor 3, which results in that the velocity vector of the air flowing through the inside space of the casing 2 has a velocity component in a direction parallel to the central axis of rotation 30 and a velocity component in the rotation direction around the central axis of rotation 30. In sum, in the separating device 1, rotation of the rotor 3 and each blade 4 generates a swirling airflow in the casing 2. The swirling airflow is a three-dimensional helically rotating airflow.

In the separating device 1, solid substances contained in the air flown in the casing 2 receive centrifugal force in a direction toward the inner peripheral surface 27 of the casing 2 from the central axis of rotation 30 of the rotor 3 while the air helically rotates in the inside space of the casing 2. The solid substances receiving the centrifugal force move toward the inner peripheral surface 27 of the casing 2 and helically rotate along the inner peripheral surface 27 in the vicinity of the inner peripheral surface 27 of the casing 2. Then, in the separating device 1, some of the solid substances in the air are discharged through the discharge port 23 in the course of passing through the inside space of the casing 2. The centrifugal force that acts on the solid substances is proportional to the mass of the solid substances. Thus, the solid substances having a relatively large mass are likely to reach the vicinity of the inner peripheral surface 27 of the casing 2 earlier than the solid substances having a relatively small mass.

In the separating device 1, the swirling airflow (swirling flow) is generated in the inside space of the casing 2, and therefore, some of the solid substances (e.g., dust) in the air flown in the casing 2 through the gas inlet 21 of the casing 2 are discharged through the discharge port 23, and air (purified air) from which the solid substances have been separated (removed) flows out through the gas outlet 22 of the casing 2.

The separating device 1 has the space 25 in the casing 2. Therefore, for example, even when a swirling flow is generated in a space between two blades 4 adjacent to each other in the rotation direction R1 of the rotor 3 between the outer peripheral surface 37 of the rotor 3 and the inner peripheral surface 27 of the casing 2, the swirling flow is readily rectified into the helical airflow in the space 25 downstream of each blade 4. Particles having a large particle size tend to deviate from the airflow when receiving the centrifugal force, approach the inner peripheral surface 27 of the casing 2, and are easily discharged through the discharge port 23. In contrast, particles having a small particle size strongly tend to move with the airflow, but in the separating device 1, the airflow is readily rectified into the helical airflow rotating along the inner peripheral surface of the casing 2 in the space 25 downstream of each blade 4, and thus, the particles having a small particle size are easily discharged through the discharge port 23.

Regarding separation characteristics of the separating device 1, the separation efficiency tends to increase as the rotational velocity of the rotor 3 increases. Moreover, regarding the separation characteristics of the separating device 1, the separation efficiency tends to increase as the separation particle size increases. In the separating device 1, for example, the rotational velocity of the rotor 3 is preferably set such that fine particles larger than or equal to a prescribed particle size are separated. The fine particles having the prescribed particle size are assumed to be, for example, particles having an aerodynamic diameter of 2 μm. The term "aerodynamic diameter" means the diameter of a particle which is in terms of aerodynamic behavior, equivalent to a spherical particle having a specific gravity of 1.0. The aerodynamic diameter is a particle size obtained from the sedimentation rate of a particle. Examples of the solid substances which are not separated by the separating device 1 and which remain in air include small fine particles having a particle size smaller than the particle size of fine particles to be separated by the separating device 1 (in other words, fine particles having a mass smaller than the mass of the fine particles to be separated by the separating device 1).

(4) Separative Performance of Separating Device

Figure 5:
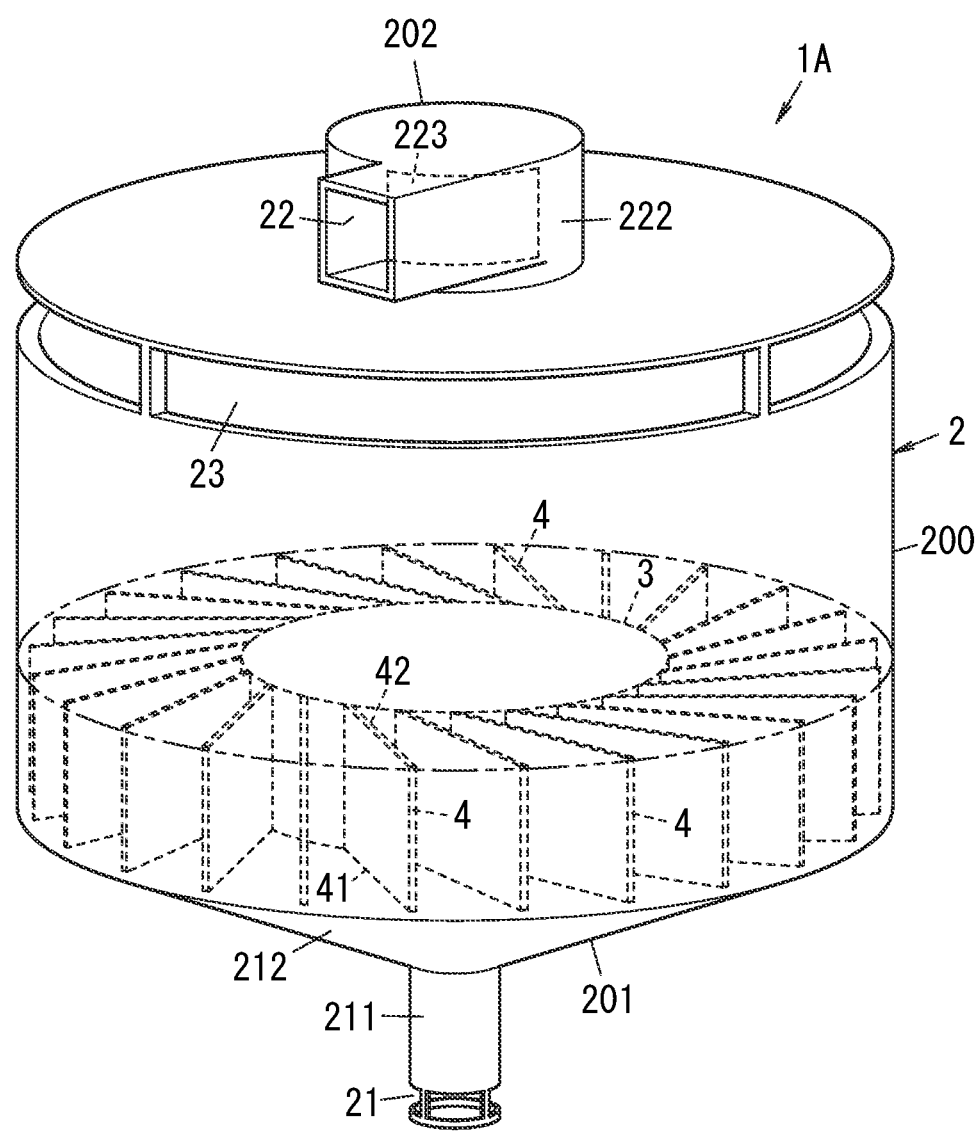
FIG. 5 is a perspective view of a separating device according to a first variation of the embodiment.
Figure 6:
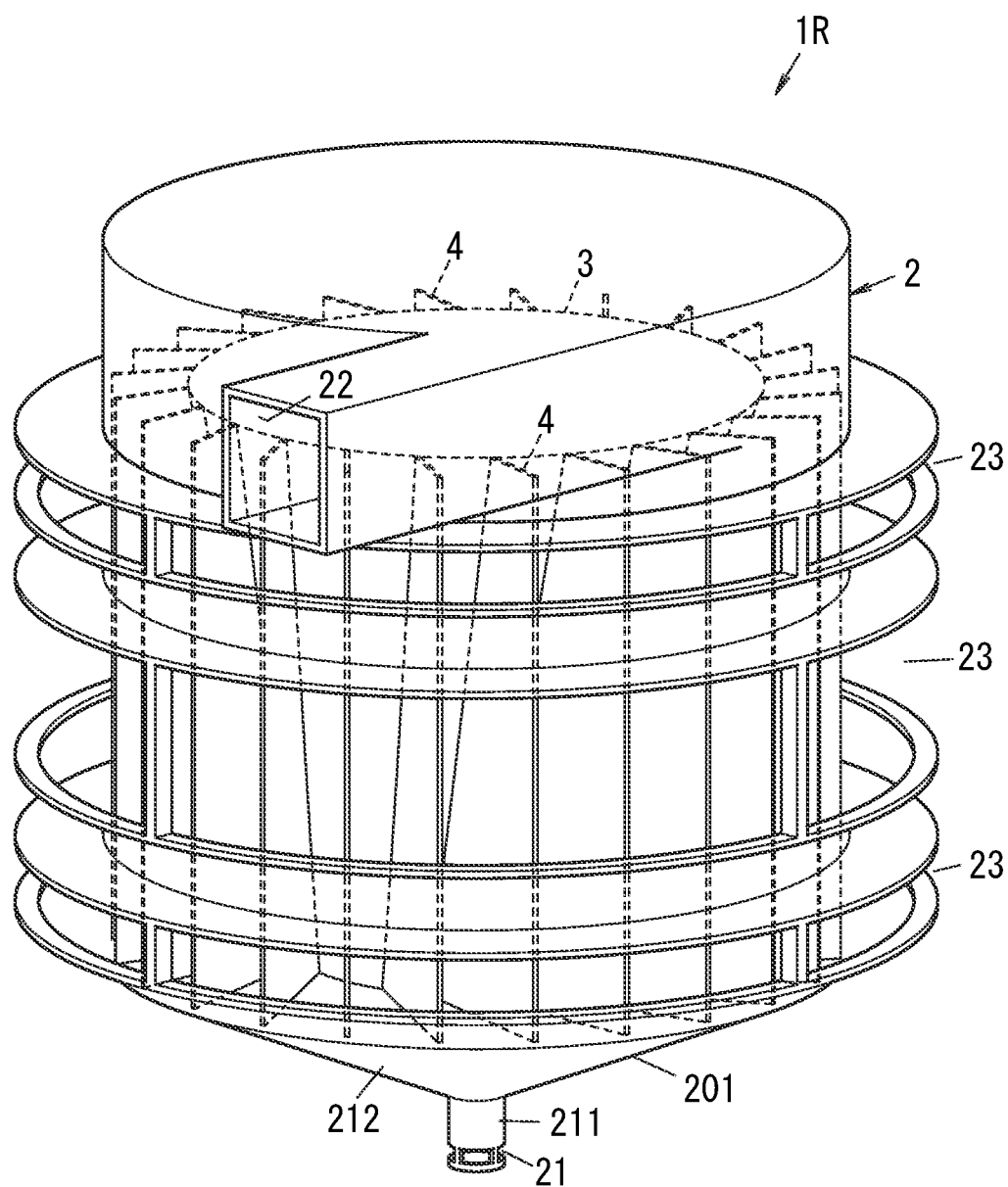
FIG. 6 is a perspective view of a separating device according to a comparative example of the embodiment.

In the following description, a separating device 1A according to a first variation of the embodiment will be described based on FIG. 5, and a separating device 1R according to a comparative example will be described based on FIG. 6 before the description of the separative performance of the separating device 1 according to the embodiment. In each of the separating device 1A according to the first variation and the separating device 1R according to the comparative example, components similar to those of the separating device 1 according to the embodiment are denoted by the same reference signs as those in the embodiment, and the description thereof is accordingly omitted.

In the separating device 1A according to the first variation, the ratio (L25/(L4+L25)) of the length L25 of a space 25 to the sum (L4+L25) of the length L4 of a blade 4 in an axial direction of a casing 2 and the length L25 of the space 25 is 0.7.

Moreover, in the separating device 1A according to the first variation, the inner diameter of a peripheral wall 222 of a second end part 202 of the casing 2 is smaller than the inner diameter φ2 of the peripheral wall 222 of the second end part 202 of the casing 2 of the separating device 1 according to the embodiment.

The separating device 1R according to the comparative example is different from the separating device 1 of the embodiment in that the separating device 1R has no space 25. In the separating device 1R according to the comparative example, the length of a blade 4 in an axial direction of a casing 2 is longer than the length L4 of the blade 4 of the separating device 1 according to the embodiment. Moreover, in the separating device 1R according to the comparative example, a plurality of discharge ports 23 are aligned in the axial direction of the casing 2.

Figure 7:
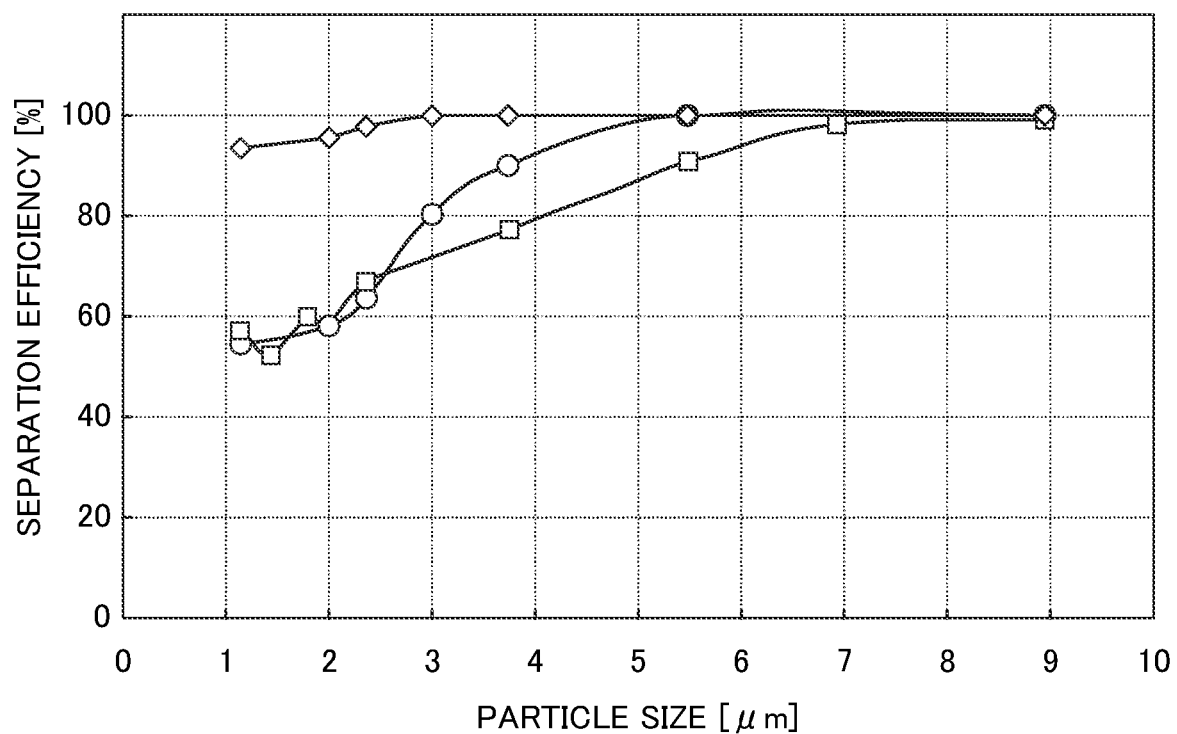
FIG. 7 is a graph illustrating separation characteristics of the separating device according to the embodiment, the separating device according to the first variation of the embodiment, and the separating device according to the comparative example of the embodiment.

FIG. 7 is a graph of a simulation result of the separation characteristics of the separating device 1 according to the embodiment, the separating device 1A according to the first variation, and the separating device 1R according to the comparative example.

In FIG. 7, the abscissa represents the particle size. In FIG. 7, the ordinate represents the separation efficiency. In FIG. 7, data plotted with diamond markers represents the separation characteristic of the separating device 1 according to the embodiment. Moreover, in FIG. 7, data plotted with circle markers represents the separation characteristic of the separating device 1A according to the first variation. Further, in FIG. 7, data plotted with square markers represents the separation characteristic of the separating device 1R according to the comparative example.

From FIG. 7, it can be seen that regarding fine particles having a particle size from 1 μm to 7 μm, the separating device 1 according to the embodiment improves the separation efficiency more than the separating device 1R according to the comparative example does. Moreover, it can be seen that regarding fine particles having a particle size from 2.6 μm to 5 μm, the separating device 1A according to the first variation improves the separation efficiency more than the separating device 1R according to the comparative example does.

Moreover, it can be seen from FIG. 7 that regarding fine particles having a particle size from 1 μm to 5 μm, the separating device 1 according to the embodiment improves the separation efficiency more than the separating device 1A according to the first variation does.

The airflow in the casing 2 of each of the separating devices 1, 1A, and 1R can be inferred from, for example, the result of a simulation performed by using fluid analysis software. As the fluid analysis software, for example, ANSYS® Fluent® may be adopted. As a result of the simulation, the inventors of the present invention obtained the knowledge that in the separating device 1R according to the comparative example, a turbulent flow such as a swirling flow is more likely to be generated in a space surrounded by a rotor 3, the two blades 4 adjacent to each other in the circumferential direction of the rotor 3, and the casing 2. In contrast, it was confirmed that the turbulent flow can be suppressed from being generated in a structure in which the space 25 is provided downstream of the blades 4 as in the case of the separating device 1 of the embodiment and the separating device 1A according to the first variation proposed by the inventors of the present invention.

Figure 8A:
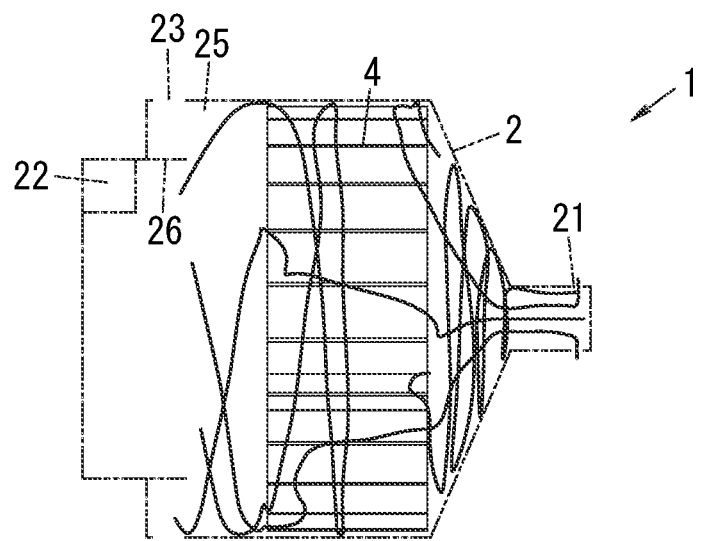
FIG. 8A is a view of a simulation result of trajectories of particles having a particle size of 2 μm with the separating device according to the embodiment.
Figure 8B:
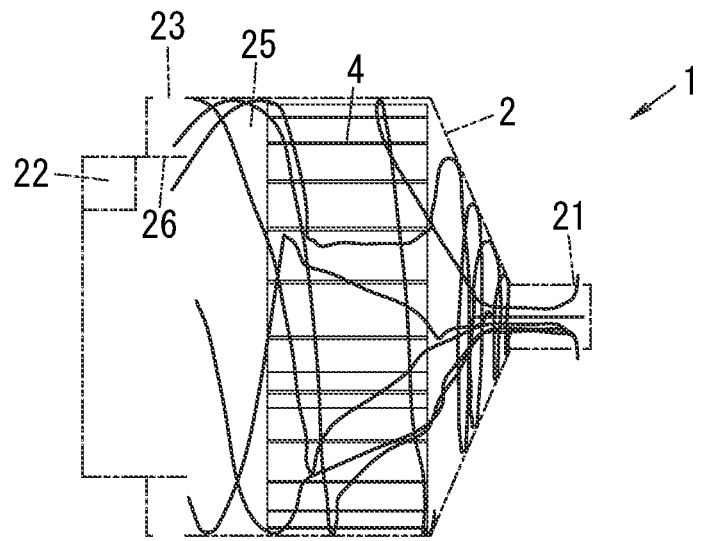
FIG. 8B is a view of a simulation result of trajectories of particles having a particle size of 5.48 μm with the separating device according to the embodiment.
Figure 8C:
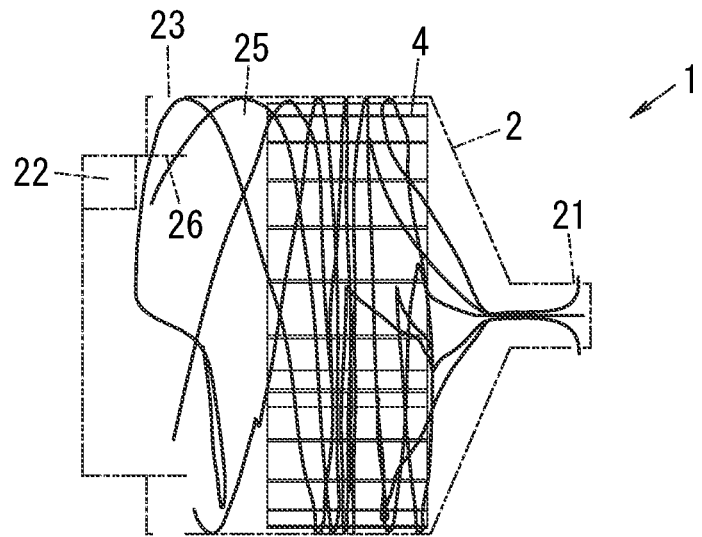
FIG. 8C is a view of a simulation result of trajectories of particles having a particle size of 8.94 μm with the separating device according to the embodiment.
Figure 9A:
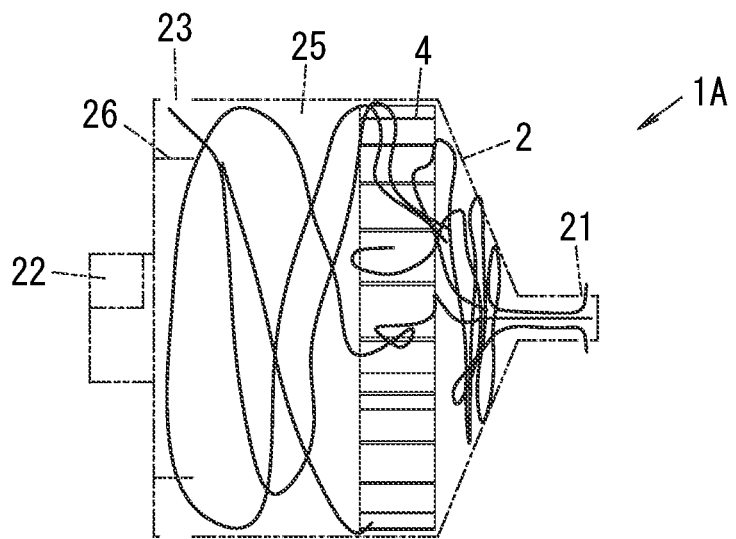
FIG. 9A is a view of a simulation result of trajectories of particles having a particle size of 2 μm with the separating device according to the first variation of the embodiment.
Figure 9B:
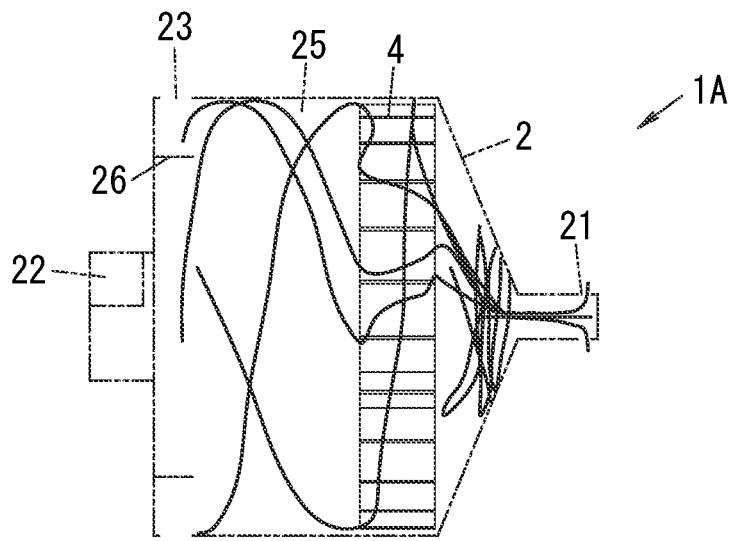
FIG. 9B is a view of a simulation result of trajectories of particles having a particle size of 5.48 μm with the separating device according to the first variation.
Figure 9C:
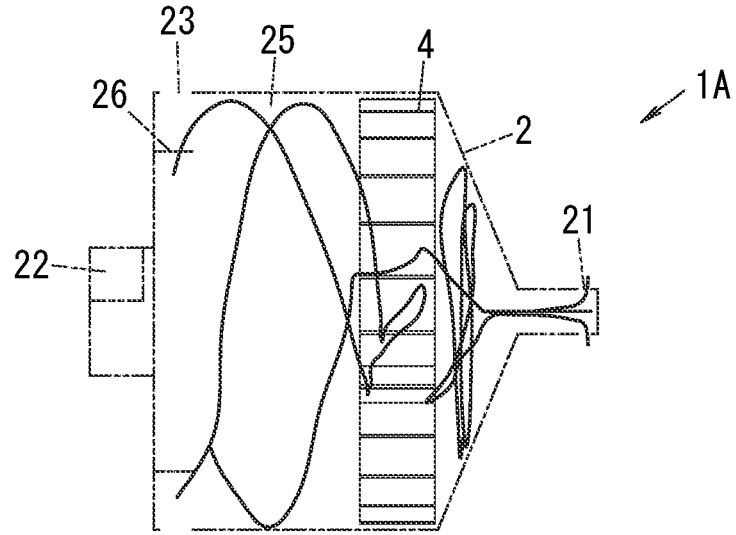
FIG. 9C is a view of a simulation result of trajectories of particles having a particle size of 8.94 μm with the separating device according to the first variation.
Figure 10A:
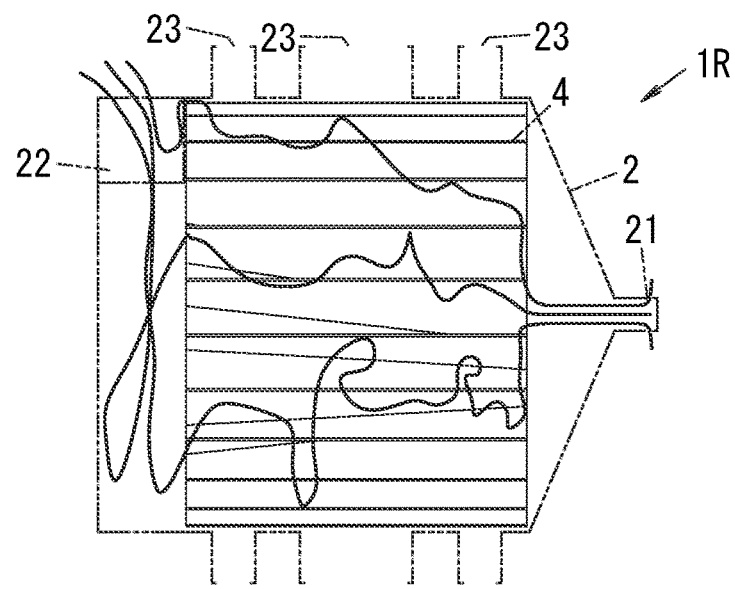
FIG. 10A is a view of a simulation result of trajectories of particles having a particle size of 2 μm with the separating device according to the comparative example.
Figure 10B:
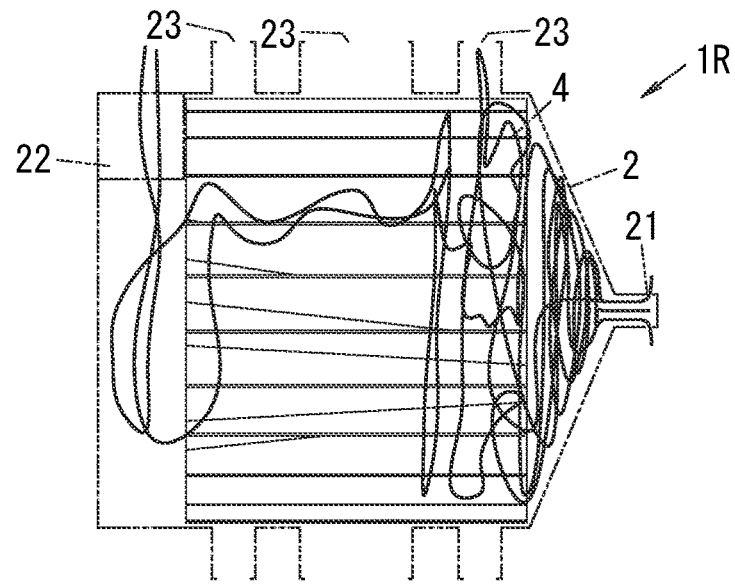
FIG. 10B is a view of a simulation result of trajectories of particles having a particle size of 5.48 μm with the separating device according to the comparative example.
Figure 10C:
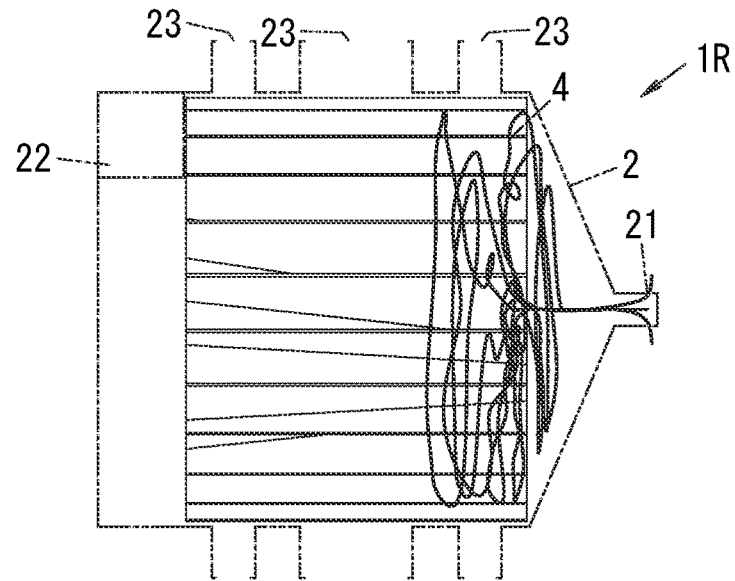
FIG. 10C is a view of a simulation result of trajectories of particles having a particle size of 8.94 μm with the separating device according to the comparative example.

Regarding each of the separating devices 1, 1A, and 1R, the inventors of the present invention further subjected the simulation results obtained by using the fluid analysis software described above to a simulation by using particle trajectory analysis software. As a particle trajectory analysis method, for example, a Discrete Phase Model (DPM) may be adopted. In FIGS. 8A to 8C, examples of trajectories of particles in the casing 2 of the separating device 1 according to the embodiment are shown in thick lines. In FIGS. 9A to 9C, examples of trajectories of particles in the casing 2 of the separating device 1A according to the first variation are shown in thick lines. In FIGS. 10A to 10C, examples of trajectories of particles in the casing 2 of the separating device 1R according to the comparative example are shown in thick lines. The trajectories shown in FIGS. 8A, 9A, and 10A are trajectories of the particles having a particle size of 2 μm. The trajectories shown in FIGS. 8B, 9B, and 10B are trajectories of the particle having a particle size of 5.48 μm. The trajectories shown in FIGS. 8C, 9C, and 10C are trajectories of the particles having a particle size of 8.94 μm. For example, from the comparison of FIGS. 8A and 9A to FIG. 10A, it can be seen that the particles having the particle size of 2 μm more easily swirl along the inner peripheral surface 27 of the casing 2 and are more easily discharged through the discharge port 23 in the separating device 1 according to the embodiment and the separating device 1A according to the first variation than in the separating device 1R according to the comparative example. Moreover, from the comparison of FIGS. 8B and 9B to FIG. 10B, it can be seen that the particles having the particle size of 5.48 μm more easily swirl along the inner peripheral surface 27 of the casing 2 and are more easily discharged through the discharge port 23 in the separating device 1 according to the embodiment and the separating device 1A according to the first variation than in the separating device 1R according to the comparative example. From the comparison of FIGS. 8C and 9C to FIG. 10c, it can be seen that the particles having the particle size of 8.94 μm easily swirl along the inner peripheral surface 27 of the casing 2 and are more easily discharged through the discharge port 23 in any of the separating device 1 according to the embodiment, the separating device 1A according to the first variation, and the separating device 1R according to the comparative example.

The ratio (L25/(L4+L25)) of the length L25 of the space 25 to the sum of the length L4 of the blade 4 and the length L25 of the space 25 in the axial direction of the casing 2 is preferably, for example, greater than or equal to 0.2 from the viewpoint of improving the separation efficiency and the viewpoint of suppressing a pressure loss.

Moreover, the ratio (L25/(L4+L25)) is preferably, for example, less than or equal to 0.8 from the viewpoint of separating fine particles having a smaller particle size.

As illustrated in FIG. 3, examples of structure parameters of the separating device 1 include the inner diameter φ1 of the small diameter part 211 of the first end part 201, the length L4 of the blade 4, the distance B0 between the inner peripheral surface and the opening 2003 of the casing body 200, the inner diameter φ2 of the peripheral wall 222 of the second end part 202, and the area of the gas outlet 22. The distance B0 between the inner peripheral surface and the opening 2003 of the casing body 200 is a distance one half of the difference between the inner diameter of the casing body 200 and the inner diameter φ2 of the peripheral wall 222 of the second end part 202. Tables 1 to 4 below show results of a simulation of the separation efficiency of the separating device 1 in the case of a change in any one of the length L4 of the blade 4, the inner diameter φ1 of the small diameter part 211 of the first end part 201, the distance B0 between the inner peripheral surface and the opening 2003 of the casing body 200, and the inner diameter $\phi 2$ of the peripheral wall 222 of the second end part 202 of the structure parameters of the separating device 1. Note that the flow rate of the gas flowing out through the gas outlet 22 is 100 m³/h.

TABLE 1

| | | |
|---|---|---|
| $\phi 1$ | 38 mm | 60 mm |
| L4 | 70 mm | 150 mm |
| B0 | 50 mm | |
| $\phi 2$ | 120 mm | |
| Area of Gas Outlet | 50 mm × 50 mm | |
| Separation Efficiency η | 57.9% | 88.8% |

TABLE 2

| | | | |
|---|---|---|---|
| $\phi 1$ | 55 mm | 60 mm | 65 mm |
| L4 | | 150 mm | |
| B0 | | 50 mm | |
| $\phi 2$ | | 120 mm | |
| Area of Gas Outlet | | 50 mm × 50 mm | |
| Separation Efficiency η | 88.4% | 88.8% | 89.1% |

TABLE 3

| | | |
|---|---|---|
| $\phi 1$ | 60 mm | |
| L4 | 150 mm | |
| B0 | 50 mm | 80 mm |
| $\phi 2$ | 120 mm | |
| Area of Gas Outlet | 50 mm × 50 mm | |
| Separation Efficiency η | 88.4% | 96.4% |

TABLE 4

| | | | |
|---|---|---|---|
| $\phi 1$ | | 60 mm | |
| L4 | | 150 mm | |
| B0 | | 50 mm | |
| $\phi 2$ | 120 mm | 250 mm | 300 mm |
| Area of Gas Outlet | | 50 mm × 50 mm | |
| Separation Efficiency η | 88.4% | 90.9% | 95.4% |
| Pressure Loss | 1000 Pa | 410 Pa | 110 Pa |

From Table 1, it can be seen that the separation efficiency is increased when the length L4 of the blade 4 is increased from 70 mm to 150 mm. Thus, increasing the length of the blade L4 would be preferable from the viewpoint of improving the separation efficiency of the separating device 1. However, in the separating device 1, if the length of the blade L4 is too long, a swirling flow tends to be generated between the blades 4 adjacent to each other. Moreover, in the separating device 1, increasing the length of the blade L4 tends to reduce the pressure loss.

Moreover, it can be seen from Table 2 that in the separating device 1, changing the operating area of the small diameter part 211 within the range from 55 mm to 65 mm does not substantially change the separation efficiency.

Moreover, it can be seen from Table 3 that in the separating device 1, the separation efficiency is improved when the distance B0 between the inner peripheral surface and the opening 2003 of the casing body 200 is increased from 50 mm to 80 mm. Thus, increasing the distance B0 would be preferable from the viewpoint of improving the separation efficiency of the separating device 1. However, the distance B0 decreases as the inner diameter $\phi 2$ of the peripheral wall 222 of the second end part 202 increases.

Moreover, it can be seen from Table 4 that in the separating device 1, the separation efficiency is improved when the inner diameter $\phi 2$ of the peripheral wall 222 of the second end part 202 is increased within a range from 120 mm to 300 mm. Thus, increasing the inner diameter $\phi 2$ would be preferable from the viewpoint of improving the separation efficiency of the separating device 1. Moreover, it can be seen from Table 4 that in the separating device 1, the pressure loss is reduced when the inner diameter $\phi 2$ of the peripheral wall 222 of the second end part 202 is increased within a range from 120 mm to 300 mm. Thus, increasing the inner diameter $\phi 2$ would be preferable from the viewpoint of reducing the pressure loss of the separating device 1.

In the separating device 1, regarding the structure parameters, a plurality of parameters are not individually optimized, but optimization is performed in consideration of a correlation between the plurality of parameters. In this case, in the separating device 1, for example, when the length of the blade 4 is changed, the separation efficiency changes, and the pressure loss also changes. In the separating device 1, at the time of adjusting, for optimization of the structure parameter, the length L4 of the blade 4 to improve the separation efficiency, the length of the blade 4 and the inner diameter $\phi 2$ of the peripheral wall 222 of the second end part 202 are adjusted such that the pressure loss is within a desired pressure loss. Moreover, in the separating device 1, the length L4 of the blade 4, the inner diameter $\phi 2$ of the peripheral wall 222 of the second end part 202, and the area of the opening area of the small diameter part 211 are accordingly adjusted to improve the separation efficiency while the pressure loss is reduced.

(5) Advantages

The separating device 1 according to the embodiment includes the casing 2, the rotor 3, and the blades 4. The casing 2 has the gas inlet 21, the gas outlet 22, the discharge port 23 for solid substances. The rotor 3 is disposed on the inner side of the casing 2 and is rotatable around the central axis of rotation 30, and the central axis of rotation 30 extends along the axial direction of the casing 2. The blades 4 are disposed between the casing 2 and the rotor 3 and rotate together with the rotor 3. Each blade 4 has the first end 41 adjacent to the gas inlet 21 and the second end 42 adjacent to the gas outlet 22. The casing 2 has a space 25 between the discharge port 23 and the second ends 42 of the blades 4 in the axial direction.

The configuration described above enables the separating device 1 according to the embodiment to improve separative performance (6) Application Example of Separating Device The separating device 1 is disposed upstream of an air filter such as a high efficiency particulate air filter (HEPA filter) disposed upstream of an air conditioning facility in an air purification system to be installed in, for example, a dwelling house. The "HEPA filter" is an air filter which has particle collection efficiency of higher than or equal to 99.97% of particles having a particle size of 0.3 μm at a rated flow rate and whose initial pressure loss is 245 Pa or less. For the air filter, a particle collection efficiency of 100% is not an essential condition. Providing the separating device 1 to the air purification system enables the air purification system to suppress the fine particles such as dust contained in air from reaching the air filter. Thus, the air purification system enables the life of, for example, an air filter provided downstream of the separating device 1 to be prolonged. For example, the air purification system enables pressure loss to be suppressed from increasing due to an increase in gross mass of, for example, fine particles collected by the air filter. Thus, the air filter in the air purification system may be replaced with a reduced frequency. The configuration of the air purification system is not limited to a configuration in which the air filter and the air conditioning facility are housed in different housings, but the air filter may be provided in the housing of the air conditioning facility. In other words, the air conditioning facility may include an air filter in addition to the air blowing device.

(7) Other Variations of Embodiment

The embodiment is a mere example of various embodiments of the present disclosure. Various modifications may be made to the embodiment depending on design and the like as long as the object of the present disclosure is achieved.

Figure 11:
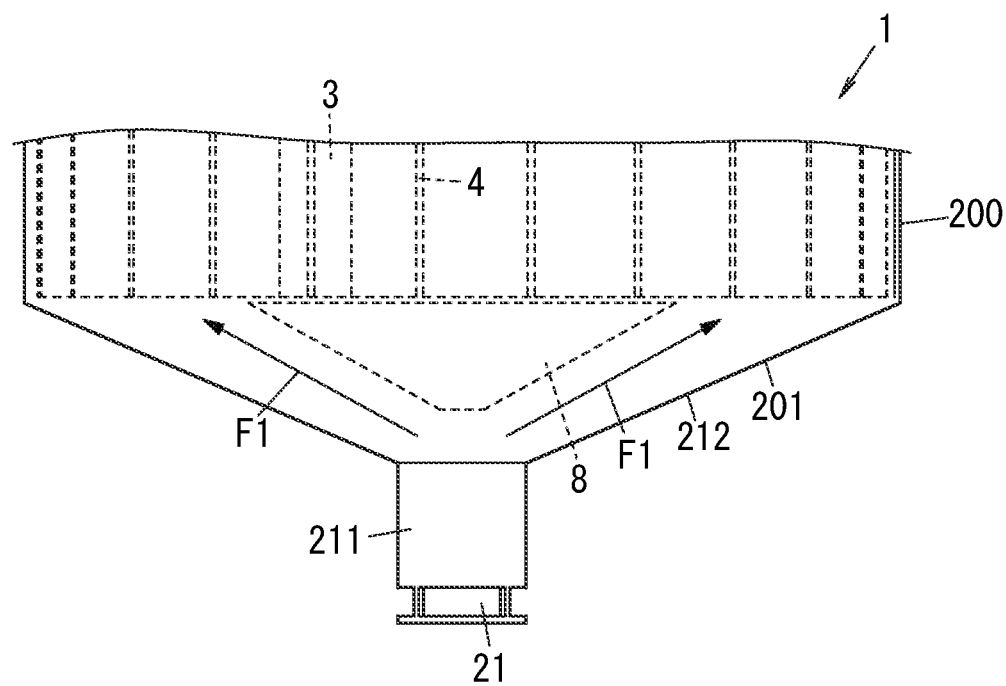
FIG. 11 is a configuration diagram of a main part of a separating device according to a second variation of the embodiment.

For example, a second variation of the embodiment may further include a rectifying structure 8 as shown in FIG. 11. The rectifying structure 8 is disposed between the gas inlet 21 and the rotor 3 on the inner side of the casing 2 and is configured to rectify a flow of a gas flowing into the casing 2. The rectifying structure 8 has, for example, a circular truncated cone shape and is disposed between the small diameter part 211 and the casing body 200 on the inner side of the expanding diameter part 212. The rectifying structure 8 is disposed such that the central axis of the rectifying structure 8 coincides with the central axis 20 (see FIG. 3) of the casing 2. Thus, in the separating device 1, the gas flowing through the gas inlet 21 into the casing 2 is easily introduced into a location far from the outer peripheral surface 37 of the rotor 3 and close to the inner peripheral surface 27 of the casing 2 in the radial direction of the rotor 3. In FIG. 11, a flow of the gas in the expanding diameter part 212 is schematically indicated by the arrow F1. The rectifying structure 8 may be, for example, supported by the casing 2 via one or more beams or may be coupled to the rotor 3.

Figure 12:
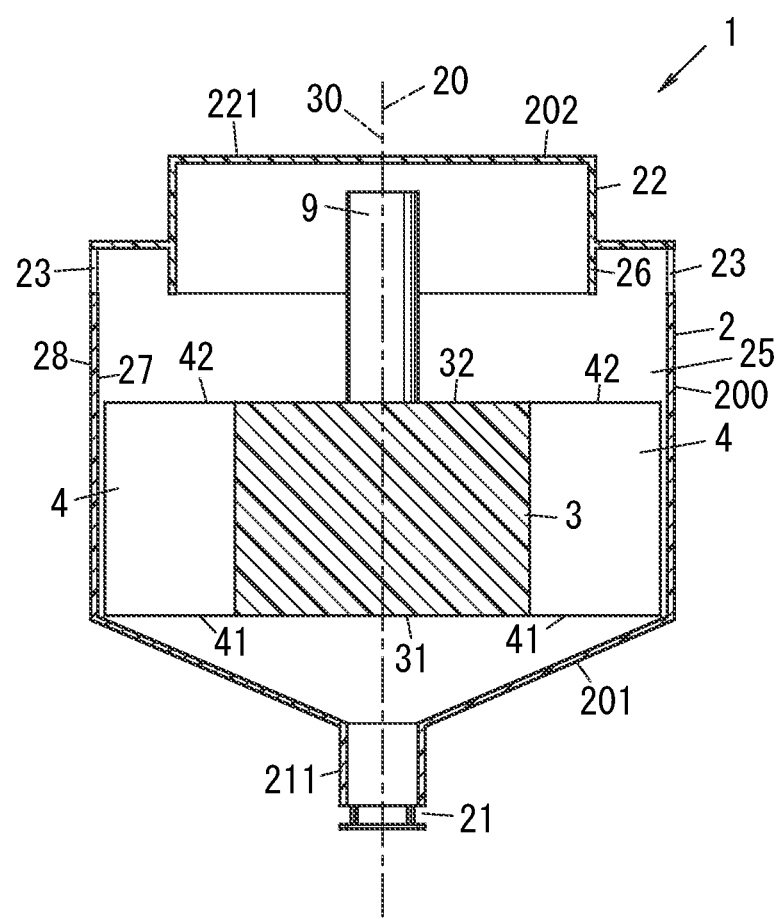
FIG. 12 is a configuration diagram of a main part of a separating device according to a third variation of the embodiment.

Moreover, a third variation of the embodiment may further include a rotation shaft 9 disposed along the central axis of rotation 30 of the rotor 3 as shown in FIG. 12. In this case, at least part of the rotation shaft 9 is disposed in the space 25. The rotation shaft 9 may be, but does not have to be, coupled to the rotor 3. Moreover, the rotation shaft 9 may rotate together with the rotor 3 or may rotate independently of the rotor 3.

Figure 13:
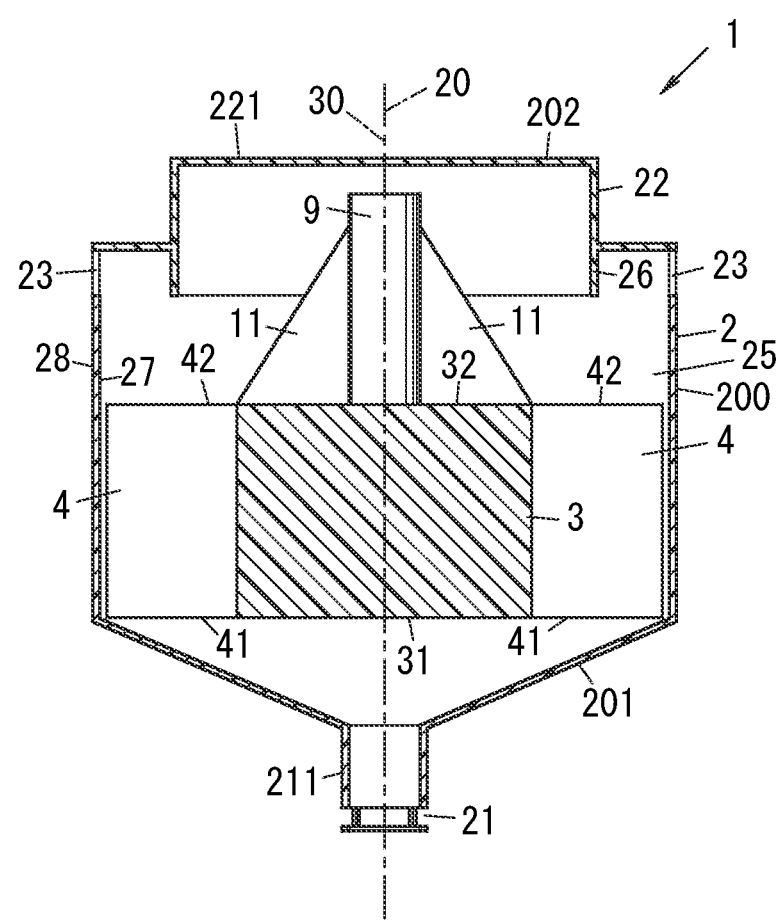
FIG. 13 is a configuration diagram of a main part of a separating device according to a fourth variation of the embodiment.

Moreover, in a fourth variation of the embodiment, the separating device 1 may further include a plurality of second blades 11 coupled to the rotation shaft 9 described in the third variation as shown in FIG. 13 in addition to a plurality of first blades constituted by the plurality of blades 4 coupled to the rotor 3. The plurality of second blades 11 are configured such that as the distance from the rotor 3 in the axial direction of the casing 2 increases, the projection dimension of each of the plurality of second blades 11 from the rotation shaft 9 decreases. Each of the plurality of second blades 11 may be, but does not have to be, tilted to one radial direction of the rotor 3 when viewed from the second end part 202 in the direction along the axial direction of the casing 2. Moreover, the projection dimension of each of the plurality of second blades 11 from the rotation shaft 9 is smaller than the projection dimension of each first blade from the rotor 3, and when viewed from its thickness direction, each of the plurality of second blades 11 may have a rectangular shape elongated in the axial direction of the rotation shaft 9.

Moreover, the discharge port 23 is not limited to being formed along the outer peripheral edge of the casing 2 or being formed in the outer peripheral surface 28 of the casing 2 but may be formed in the bottom part 2001 of the casing body 200. The discharge port 23 is not limited to being at a location where the discharge port 23 does not to overlap the blades 4 in the direction orthogonal to the central axis of rotation 30 of the rotor 3 but may be at a location where the discharge port 23 at least partially overlaps the blades 4 in the direction orthogonal to the central axis of rotation 30. Moreover, the casing 2 of the separating device 1 may have the discharge port 23 at a location where the discharge port 23 does not overlap the blades 4 in the direction orthogonal to the central axis of rotation 30 and a discharge port at a location where the display port overlaps the blades 4 in the direction orthogonal to the central axis of rotation 30.

Moreover, the casing 2 is not limited to having the plurality of discharge ports 23 but may have one discharge port 23. When the casing 2 has one discharge port 23, the one discharge port 23 may have an arc shape viewed in the axial direction of the casing 2 or may have an annular shape formed over the entire circumference in the circumferential direction of the casing 2 (direction along the outer perimeter of the casing 2), for example.

Moreover, the plurality of discharge ports 23 are not limited to having the same shape but may have different shapes.

Moreover, each of the plurality of blades 4 has a tip end adjacent to the casing 2 in the protrusion direction from the rotor 3 and a base end adjacent to the rotor 3, and the tip end is located frontward of the base end in the rotation direction R1 of the rotor 3.

Moreover, each of the plurality of blades 4 may have a shape having one or more curved portions in the shape of, for example, an arc.

Moreover, each of the plurality of blades 4 may have a helical shape around the central axis of rotation 30 of the rotor 3. Here, "helical" is not limited to a helical shape with one or more turns but includes a shape corresponding to part of the helical shape with one turn.

Moreover, the rotor 3 may include a plurality of rotary members. In this case, in the rotor 3, for example, the rotary members aligned in a direction along the central axis 20 of the casing 2 are coupled to each other.

Moreover, the casing 2 in the separating device 1 may have a plurality of gas outlets 22. In this case, the casing 2 may have a plurality of outlet duct parts 203. The plurality of outlet duct parts 203 may be aligned in the circumferential direction of the casing 2 or may be located at different locations in the axial direction of the casing 2. Moreover, the separating device 1 has a configuration provided with no outlet duct part 203.

Moreover, the gas flowing through the gas inlet 21 of the casing 2 into the casing 2 is not limited to air but may be, for example, exhaust gas.

Moreover, the shape of the partition wall 26 is not limited to an annular shape but may be an arc shape when viewed in the axial direction of the casing 2. In this case, one partition wall 26 may be provided, or a plurality of partition walls 26 may be provided.

(Aspects)

The present specification discloses the following aspects.

A separating system (1; 1A) according to a first aspect includes a casing (2), a rotor (3), and a blade (4). The casing (2) has a gas inlet (21), a gas outlet (22), and a discharge port (23) for solid substances. The rotor (3) is disposed on an inner side of the casing (2) and is configured to be rotatable around a central axis of rotation (30) of the rotor (3), the central axis of rotation (30) extending along an axial direction of the casing (2). The blade (4) is disposed between the casing (2) and the rotor (3) and is configured to rotate together with the rotor (3). The blade (4) has a first end (41) adjacent to the gas inlet (21) and a second end (42) adjacent to the gas outlet (22). The casing (2) has a space (25) between the second end (42) of the blade (4) and the discharge port (23) in the axial direction.

The separating system (1; 1A) according to the first aspect improves separative performance of separating the solid substances contained in a gas from the gas.

In a separating device (1; 1A) of a second aspect referring to the first aspect, the discharge port (23) is formed along an outer peripheral edge of the casing (2).

In the separating device (1; 1A) of the second aspect, the separation efficiency is improved more than in the case where the discharge port (23) is not formed along the outer peripheral edge of the casing (2).

In a separating device (1; 1A) of a third aspect referring to the second aspect, the discharge port (23) is formed in an outer peripheral surface (28) of the casing (2).

In the separating device (1; 1A) of the third aspect, the solid substances to which centrifugal force is applied are easily discharged through the discharge port (23).

In a separating device (1; 1A) of a fourth aspect referring to any one of the first to third aspects, the casing (2) further includes a partition wall (26) in the space (25), the partition wall partitioning between the discharge port (23) and the gas outlet (22).

In the separating device (1; 1A) of the fourth aspect, the solid substances to which centrifugal force is applied are easily discharged through the discharge port (23) and are less likely to flow out through the gas outlet (22).

In a separating device (1; 1A) of a fifth aspect referring to any one of the first to fourth aspects, the discharge port (23) is at a location where the discharge port (23) does not overlap the blade (4) in a direction orthogonal to the central axis of rotation (30).

In the separating device (1; 1A) of the fifth aspect, the separation efficiency is improved more than in the case where the discharge port (23) is at a location where the discharge port (23) at least partially overlaps the blade (4) in a direction orthogonal to the central axis of rotation (30).

A separating device (1; 1A) of a sixth aspect referring to any one of the first to fifth aspects further includes a rectifying structure (8). The rectifying structure (8) is disposed between the gas inlet (21) and the rotor (3) on the inner side of the casing (2) and is configured to rectify a flow of a gas flowing into the gas inlet (21).

The separating device (1; 1A) of the sixth aspect is configured to rectify the flow of the gas flowing into the casing (2).

In a separating device (1; 1A) of a seventh aspect referring to any one of the first to sixth aspects, the gas inlet (21) penetrates the casing (2) in a direction intersecting the axial direction of the casing (2).

In the separating device (1; 1A) of the seventh aspect, the flow rate of the gas flowing through the gas inlet (21) is suppressed from excessively increased.

A separating device (1; 1A) of an eighth aspect referring to any one of the first to seventh aspects further includes a rotation shaft (9). The rotation shaft (9) is disposed along the central axis of rotation (30) of the rotor (3). The rotation shaft (9) is at least partially disposed in the space (25).

Note that constituent elements according to the second to eighth aspects are not essential constituent elements for the separating device (1; 1A) but may be omitted as appropriate.

A separating system (10) of a ninth aspect includes: the separating device (1; 1A) of any one of the first to eighth aspects; and a driving device (6). The driving device (6) is configured to rotationally drive the rotor (3).

The separating system (10) of the ninth aspect improves separative performance of separating the solid substances contained in a gas from the gas

REFERENCE SIGNS LIST 1, 1A Separating Device
10 Separating System
2 Casing
21 Gas Inlet
22 Gas Outlet
23 Discharge Port
25 Space
3 Rotor
4 Blade
41 First End
42 Second End
6 Driving Device
8 Rectifying Structure
9 Rotation Axis
30 Central Axis of Rotation

The invention claimed is:

1. A separating system comprising:
a separating device comprising:
  a casing having a gas inlet, a gas outlet, and a discharge port for solid substances;
  a rotor disposed in an inside of the casing and configured to be rotatable around a central axis of rotation of the rotor, the central axis of rotation extending along an axial direction of the casing; and
  a plurality of blades disposed between the casing and the rotor and configured to rotate together with the rotor; and
a driving device configured to rotationally drive the rotor, wherein:
the rotor has a first end adjacent to the gas inlet and a second end adjacent to the gas outlet,
each of the plurality of blades has a first end adjacent to the gas inlet and a second end adjacent to the gas outlet,
the casing includes a space between the second end of each of the plurality of blades and the discharge port in the axial direction,
an entirety of the rotor is disposed in the inside of the casing,
in the axial direction of the casing, the first end and the second end of the rotor are apart from the casing,
the separating device further comprises a rectifying structure disposed between the gas inlet and the rotor on the inside of the casing and configured to rectify a flow of a gas flowing into the gas inlet,
the casing includes a casing body, a first end part, a second end part, and an outlet duct part,
the first end part, the casing body, and the second end part are aligned in an order of the first end part, the casing body, and the second end part in the axial direction of the casing,
in the casing, the first end part includes the gas inlet, the outlet duct part includes the gas outlet, and the casing body includes the discharge port,
the second end part includes an inside space in communicative connection with an inside space of the casing body,
the second end part has a bottomed cylindrical shape having a disk-shaped bottom part and a peripheral wall having a cylindrical shape, the peripheral wall of the second end part includes an opening through which a gas flows out, the outlet duct part is connected to a peripheral edge of the opening at an outer peripheral surface of the second end part, the first end part includes:
- a small diameter part including the gas inlet and having a bottomed cylindrical shape; and
- an expanding diameter part connected to the small diameter part and the casing body, an outer diameter and an inner diameter of the small diameter part are respectively smaller than an outer diameter and an inner diameter of the casing body, the gas inlet is formed in the small diameter part, the expanding diameter part has a taper cylindrical shape, an outer diameter and an inner diameter of the expanding diameter part gradually increases toward the casing body as a distance from the small diameter part increases in the axial direction of the casing, the rectifying structure has a circular truncated cone shape and is disposed between the small diameter part and the casing body on an inner side of the expanding diameter part, the rectifying structure is disposed such that a central axis of the rectifying structure coincides with a central axis of the casing, the casing body includes a plurality of discharge ports, the plurality of discharge ports includes the discharge port, and the plurality of discharge ports are aligned in a circumferential direction along an outer peripheral edge of the casing, and the driving device is disposed in the inside of the casing.

2. The separating system of claim 1, wherein
the discharge port is formed along an outer peripheral edge of the casing.

3. The separating system of claim 2, wherein
the discharge port is formed in an outer peripheral surface of the casing.

4. The separating system of claim 1, wherein
the casing further includes a partition wall in the space, the partition wall partitioning between the discharge port and the gas outlet.

5. The separating system of claim 1, wherein
the discharge port is located at a location where the discharge port does not overlap the plurality of blades in a direction orthogonal to the central axis of rotation.

6. The separating system of claim 1, wherein
the gas inlet penetrates the casing in a direction intersecting the axial direction of the casing.

7. The separating system of claim 1, further comprising a rotation shaft disposed along the central axis of rotation of the rotor, wherein
the rotation shaft is at least partially disposed in the space.

8. The separating system of claim 1, wherein:
the gas inlet and the gas outlet are open lateral to the casing, in the axial direction of the casing, the discharge port is located between the gas inlet and the gas outlet, the outlet duct part is a duct for feeding the gas from which solid substances having been separated to an outside of the casing, and when viewed in the axial direction of the casing, the outlet duct part extends from an outer peripheral surface of the casing in a direction along a tangential direction of the outer peripheral surface.

* * * * *